H. H. STEPHENS AND T. GRAY.
SHIM AND METHOD OF MAKING THE SAME.
APPLICATION FILED MAR. 24, 1919.
1,365,291.                                    Patented Jan. 11, 1921.
                                                    2 SHEETS—SHEET 1.
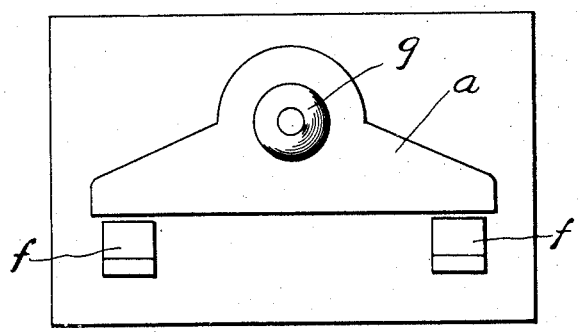
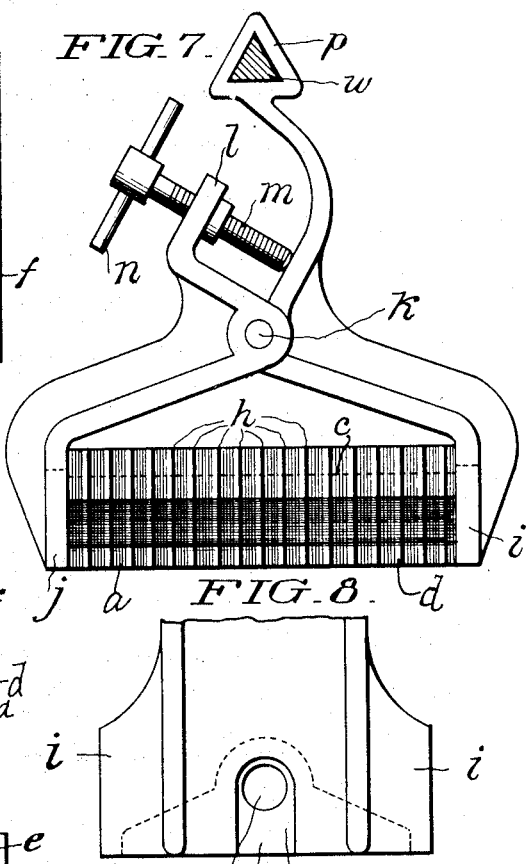
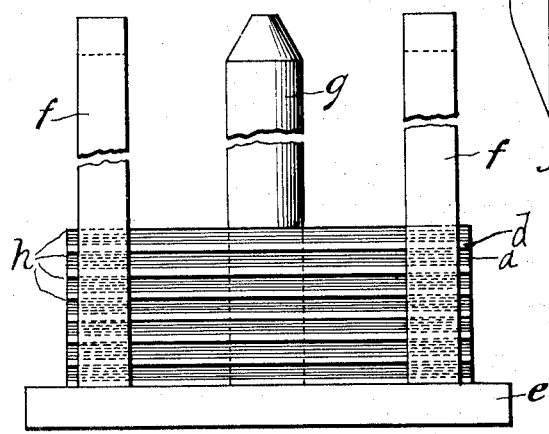
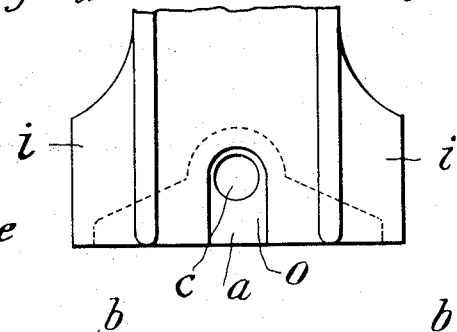
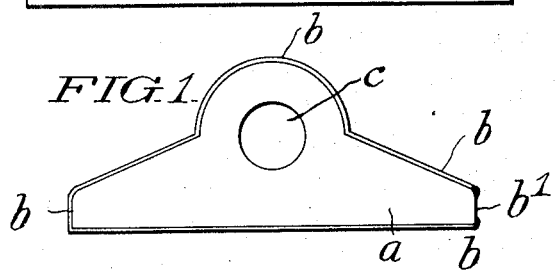
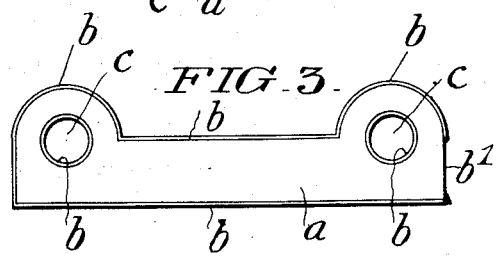
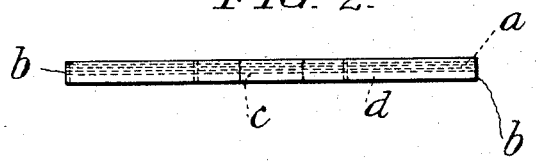
INVENTORS
Harry H. Stephens
and Thomas Gray
BY Cornelius D. Ehret
their ATTORNEY.

H. H. STEPHENS AND T. GRAY.
SHIM AND METHOD OF MAKING THE SAME.
APPLICATION FILED MAR. 24, 1919.
1,365,291.
Patented Jan. 11, 1921.
2 SHEETS—SHEET 2.
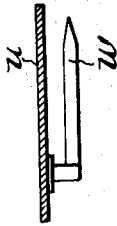
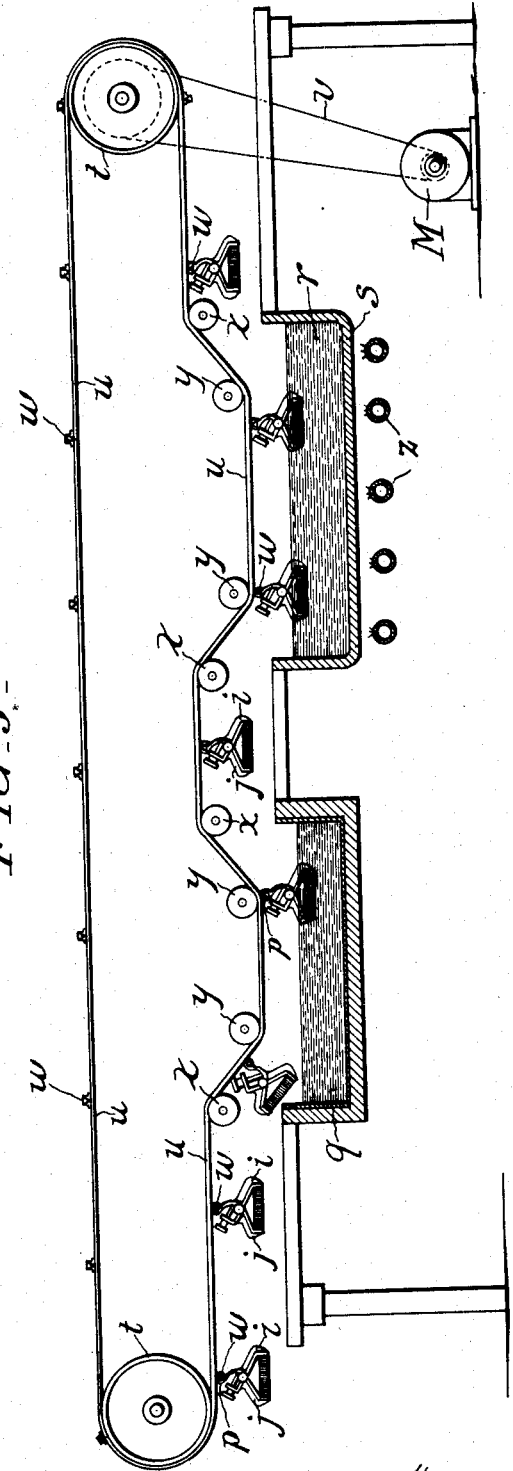
INVENTORS
Harry H. Stephens and
Thomas Gray
BY
Cornelius D. Ehret
their ATTORNEY.

UNITED STATES PATENT OFFICE.

HARRY H. STEPHENS, OF PATERSON, AND THOMAS GRAY, OF JERSEY CITY, NEW JERSEY.

SHIM AND METHOD OF MAKING THE SAME.

1,365,291.  Specification of Letters Patent.  Patented Jan. 11, 1921.

Application filed March 24, 1919. Serial No. 284,531.

*To all whom it may concern:*

Be it known that we, HARRY H. STEPHENS and THOMAS GRAY, citizens of the United States, residing, respectively, in Paterson and Jersey City, State of New Jersey, have invented certain new and useful Improvements in Shims and Methods of Making the Same, of which the following is a specification.

Our invention resides in laminated shims such as commonly employed for holding apart at predetermined or desirable distance parts of machinery, as bearings and the like.

As commonly employed, shims consist of a plurality of thin sheets of brass or other suitable material disposed in a group and inserted between the two parts which are to be held together at predetermined distance from each other, one or more of these thin sheets of laminæ being removed from time to time as wear or other occasion may require.

Our invention resides in a laminated shim in which the shim laminæ are bound or held together until such time as the thickness of the shim is to be reduced by removing one or more of its laminæ. In accordance with our invention the laminæ are bound or held together by solder or other suitable binder applied throughout or substantially throughout the entire exposed edges of the laminæ, the solder or binder overlying the edges of all the laminæ and so holding them firmly to each other, with their metallic faces in intimate contact with each other without intervening binder, as solder, or other compressible material.

Our invention resides in a laminated shim whose laminæ are so held together which may comprise, in addition to the thin removable laminæ, an underlying sheet or lamina, base or backing of relatively greater thickness, and of material differing from or similar to the material of the laminæ.

Our invention resides also in the method of producing laminated shims.

For an illustration of our shim and for an understanding of our method, reference is had to the accompanying drawing, in which:

Figure 1 is a plan view of our shim.

Fig. 2 is an edge view of the same.

Figs. 3 and 4 are plan and edge views, respectively, of a further form of shim embodying our invention.

Figs. 5 and 6 are, respectively, plan and elevational views of an assembling structure or tool.

Fig. 7 is a side view of a clamp holding a plurality of shims.

Fig. 8 is a fragmentary side view of one of the clamping jaws.

Fig. 9 is a side elevational view, partly in section, illustrating mode of soldering or binding the shim laminæ together.

Fig. 10 is a fragmentary view showing the belt or conveyer in cross section with a clamp holding member attached.

Referring to Figs. 1 and 2, a plurality of laminæ $a$, of thin sheet steel, brass or other suitable material, for example about .003 inch in thickness, are held in fixed position with respect to each other, with the metallic faces of the shim laminæ in close contact with each other, without intervening solder or other compressible material, by solder $b$ applied all around the edges of the laminæ and bridging their edges, and so holding them snugly in facial contact with each other. The solder $b$ is of any suitable thickness, but is preferably a very thin coat, the indication of the solder in Fig. 1 being exaggerated for the sake of clearness. The shim laminæ have registering bolt holes $c$. The edges of the laminæ $a$ within the bolt hole may, if desired, also be coated and bridged with solder $b$, though we prefer to omit solder from holes $c$, as indicated. However, our invention is not limited to so coating the laminæ edges within the bolt hole or holes. The laminæ $a$ may be grouped together as described, and so form a complete shim, or there may be associated therewith a backing or base plate $d$ of steel or other suitable material of relatively greater thickness than the laminæ. The backing plate $d$ may also be held to the laminæ $a$ by the solder $b$, which also extends to and covers the edge of the sheet $d$, holding the sheet $d$ and the laminæ $a$ in a single group.

In Figs. 3 and 4 the structure is the same as described in connection with Figs. 1 and 2, except that the shim is of another common form, namely, one suitable for a main bearing or other structure requiring two bolt holes $c, c$, having therein solder $b$.

When the shims have been constructed as described, they may be employed as shims usually are employed, between parts which are to be held securely together but at a predetermined distance from each other.

In case of wear, our shim may be removed and the solder between the desired neighboring laminæ $a$ may be penetrated by a knife point or other sharp instrument, thus lifting or removing one or more laminæ from the rest by rupturing the thin solder bond at the extreme edges, the neighboring faces of the shim laminæ being clean or free of solder or other binding or compressible material.

The separation of the shim laminæ may be facilitated by first removing the solder $b$ throughout the thickness of the shim, as at one end thereof, $b^1$, Figs. 1 and 3, leaving the shim laminæ exposed at such small or narrow region, to facilitate entry of the pointed instrument for removing one or more laminæ, as may be desired. This removal of solder or binder, as at $b^1$, may be accomplished by touching the shim to an emery wheel or the like, which will grind off the binder at the desired locality and so expose the edges of the laminæ.

Any other mode of locality removing the solder may be resorted to; or the edges of the laminæ may be suitably covered or otherwise treated locally to prevent adherence of solder or binder throughout such restricted locality.

Our shim is practically incompressible, because between the shim laminæ there is no solder, binder or other compressible material. Our shim is particularly incompressible when the laminæ $a$ are made of steel, our preferred combination being that comprising laminæ $a$ of steel with the backing or base $d$ also of steel.

Compressibility of a shim, as where solder or other binder, or other compressible material exists between the laminæ, is a disadvantage, and compressibility is increased as the number of laminæ in the shim is increased.

Furthermore, shim structures of predetermined thickness employing solder, binder, or compressible material between the neighboring laminæ, as above referred to, and with a predetermined number of laminæ, involve or require thinner laminæ because of the presence of the intervening material. Such reduction in thickness of the laminæ involves greater cost of sheet material than in the case where the laminæ themselves are relatively thicker, as in our structure.

The amount of solder or binder required in our structure is materially less than that required where the adjacent laminæ faces are soldered together by a film of solder intervening between laminæ throughout their adjacent faces.

Because of absence of compressible or binding material between our laminæ, the thickness of our shims does not materially vary, and are true and remarkably uniform in total thickness.

A method for producing our shims rapidly and inexpensively is the following.

Sheets of metal from which the laminæ $a$ and base $d$ are to be formed are procured in any suitable size, the thicknesses of the sheets to correspond, respectively, with the thicknesses of the laminæ $a$ and base $d$.

If for example, shims are to be produced having a base $d$ of $\frac{1}{16}$ of an inch thickness and four laminæ each of a thickness of .003 inch, upon a sheet or plate of steel or other material of $\frac{1}{16}$ inch thickness are laid or stacked on top of each other four sheets of steel or other material each of .003 inch thickness. Then either upon the exposed face of the base sheet of $\frac{1}{16}$ inch thickness, or upon the exposed face of the fourth or top lamina forming sheet is placed a sheet of paper, which may be held in place, if necessary, by paste or any other suitable means.

These stacked metal sheets or plates are temporarily bound together by suitable clamps for holding them in fixed relation with each other during the punching operation.

From the sheets so stacked are then punched shim groups of the desired shape or form, such for example as illustrated in Figs. 1 and 3, or any other suitable shape, the bolt holes $c$ being simultaneously punched.

As each shim group comes from the punching press, it is placed or falls on to an assembling structure or tool, as illustrated in Figs. 5 and 6. In this structure there is provided a suitable base plate $e$, to which are secured the vertical guides $f, f$ and post $g$, the latter being suitably tapered or conical at its upper end, and entering the bolt holes $c$.

The guides $f, f$ and post $g$ are high or long enough to accommodate a large number of shim groups, for example, 50 to 100 in number.

There are collected then upon the assembly tool a large number of shim groups, each comprising a base element $d$, laminæ $a$ and a sheet of paper $h$.

A suitable number of shim groups is removed from the assembling tool and held in a clamp, Figs. 7 and 8, comprising the clamp jaws $i$ and $j$ pivoted to each other at $k$, the jaw $j$ having a lug $l$ through which is threaded the screw $m$, having turning handle $n$ and abutting against the companion jaw member $i$. By suitably turning the handle $n$ the jaws $i$ and $j$ are forced toward each other and securely clamp the numerous shim groups on their flat faces, leaving the edges of all the laminæ and sheets exposed, as indicated in Fig. 7, and having paper sheets between groups.

In event it is desired that the sheets or laminæ constituting a shim shall also be soldered at their edges within the bolt hole $c$, the jaw members $i$ and $j$ may have formed therein, as indicated in Fig. 8 in connection with the jaw member $i$, a slot $o$ which extends upwardly to allow ingress of solder or binder into the alined bolt holes $c$ in the stack of shim groups held between the jaws $i$ and $j$. The slots $o$ are, however, preferably omitted.

Each clamp structure is provided with a polygonal opening $p$ or other suitable means for supporting it against rotation on a member $w$ carried by a structure which moves the clamp and the shim groups held thereby through suitable baths.

Referring to Fig. 9, $q$ is a bath of acid or other liquid whose composition or nature is such as to clean or prepare the edges of the shim laminæ for receiving solder or other binder, a bath of which is shown at $r$ within a receptacle $s$ of metal or other suitable material which may be either exteriorly or interiorly heated to keep the solder or binder $r$ at suitable operative temperature.

Disposed in suitable relation with respect to the baths $q$ and $r$ are the wheels $t$ over which passes the belt, chain or other flexible band $u$, driven by one of the wheels $t$, which in turn may be driven by belt $v$ driven by an electric or other motor M.

Carried by and spaced along the belt $u$ are the members $w$ upon which are slid the clamps, each clamp holding a plurality of shim groups, as indicated in Fig. 7.

The lower side of the belt $u$ travels toward the right, as indicated by the arrow. At the left end of the structure illustrated in Fig. 9, as each member $w$ passes, a clamp holding the shim groups is slid thereon. The belt $u$ passes over the roller $x$ and under the roller $y$ downwardly adjacent the bath $q$ into which the clamp carries the shim groups whose edges are throughout their entire extents wetted and prepared by the liquid $q$. The clamps and their shim groups pass toward the right through the acid $q$, and then are carried upwardly out of the bath $q$ by passage of the belt $u$ under the third roller $y$ and over the fourth roller $x$. The belt $u$ then passes over the further pairs of rollers $x$ and $y$ carrying the clamps and the shim groups carried thereby, and whose edges are previously prepared by the liquid $q$, downwardly and into the solder or other binding material $r$, which adheres to the edges of all the sheets held by the clamps, producing a film of solder or binder over the edges and across the adjacent edges. The clamps and shim groups rise out of the bath $q$ and are suitably cooled, as by blowing air thereon, and after passing the last roller $x$ the clamps and shims held thereby are removed from the supporting elements $w$.

Due to the triangular or equivalent shape of members $w$ and openings $p$, the clamps cannot rotate or move with respect to belt $u$, and so the clamps and shim groups are forced beneath the surface of the solder $r$ on which they might otherwise float.

The clamp members $j$ and $i$ are preferably made of some material to which the solder will not adhere, and preferably also of a material such as will not be seriously attacked by the acid or preparing liquid $q$. The members $i$ and $j$ may be made of aluminum or any other suitable material.

Considering a clamp with its contained shim groups with a coat of solder over their edges as having been removed from the belt $u$, the clamps are removed and we then have a plurality of shims held to each other by solder, each consisting of a plurality of laminæ soldered together at their edges; but between shims or shim groups are the sheets of paper $h$ holding neighboring shims slightly apart, though the solder $b$ has extended across the edge of the paper, which is preferably slow burning or only slightly, if at all, affected by the hot solder, and so lightly binds the different shims together. The group of shims is easily broken up into individual shims by striking the group upon a table or other suitably firm object, or by striking the group a sharp blow. The paper between neighboring shims prevents their adhesion to each other, and only the thin coat of solder extending across the edge of the papers need be broken. The ridge of solder at the edge of each shim, where paper was present, is readily removed. And the paper on one face of each shim is also removed; and if the paper has been gummed or otherwise fastened to the metal sheet before the punching operation above described, it may be soaked or ground off.

It will be understood that our invention is not limited to the employment of paper, but that any other suitable means or material may be employed to prevent the shim groups from being as firmly soldered to each other as are the laminæ of each shim.

What we claim is:

1. A shim comprising a plurality of superposed laminæ held together with their adjacent faces in direct contact with each other by a binder on and extending across their edges throughout substantially the entire edge surface of the laminæ group.

2. A shim comprising a thick base sheet with a plurality of thin laminæ superposed thereon and held with their adjacent faces in direct contact with each other by a binder on and extending across their edges and into binding relation with said thick base sheet throughout substantially the entire edge surface of said laminæ and base sheet.

3. A shim comprising a plurality of superposed laminæ having holes in register with each other and held with their adjacent faces in direct contact by a binder on and extending across their exterior edges and not at said holes.

4. A shim comprising a plurality of superposed steel laminæ held together with their adjacent faces in direct contact with each other by a metallic binder on and extending across their edges throughout substantially the entire edge surface of the laminæ group.

5. The method of producing laminated shims, which consists in holding shim laminæ in register with each other with their adjacent faces in direct contact with each other, and applying binding material to and across the exposed edges of said laminæ throughout substantially their entire extent.

6. The method of producing shims, which consists in holding shim laminæ in register with each other with their adjacent faces in direct contact, plunging the laminæ into a bath of solder or binder whereby solder is applied throughout the external edge surface of the laminæ group to hold said laminæ firmly in connection with each other, and thereafter removing the solder or binder from a small portion of the edge surface of the group, whereby the laminæ are there exposed for insertion of a separating instrument.

7. The method of making shims, which consists in superposing a plurality of sheets of the thickness of the shim laminæ, punching shim laminæ from said sheets in superposed relation, holding a plurality of shim groups in superposed relation with the laminæ of all groups held firmly in direct facial contact with each other, applying binder throughout substantially the entire exposed edge surface of all the laminæ groups, and thereafter separating the groups from each other by rupturing the binder joining adjacent groups.

8. The method of making shims, which consists in superposing a plurality of shim laminæ to form a group, superposing a plurality of groups with interposed spacing material, applying a binder of a character adhering to the laminæ but not to said spacing material to bind the edges of the laminæ of the groups and the groups to each other, and thereafter separating the groups by rupturing the binder extending across said spacing material.

9. The method of making shims, which consists in superposing a plurality of shim laminæ to form a group, superposing a plurality of groups with interposed paper, applying a binder of a character adhering to the laminæ but not to said paper to bind the edges of the laminæ of the groups and the groups to each other, and thereafter separating the groups by rupturing the binder extending across the edge of said paper.

10. The method of making shims, which consists in superposing upon a base sheet a plurality of laminæ sheets, placing with said laminæ and base sheet a sheet of separating material, punching shim groups from said superposed sheet, laminæ and separating material, assembling a plurality of said groups in register with each other with said separating material separating neighboring groups, applying binder to the edge surface of said laminæ base and across said separating material, and thereafter separating the shim groups from each other by rupturing the binder extending across said separating material.

In testimony whereof we have hereunto affixed our signatures this 21 day of March, 1919.

HARRY H. STEPHENS.
THOMAS GRAY.